(12) United States Patent
Amaro, Jr. et al.

(10) Patent No.: US 11,656,609 B2
(45) Date of Patent: May 23, 2023

(54) DETECTING COMPONENT DEGRADATION IN INDUSTRIAL PROCESS PLANTS BASED ON LOOP COMPONENT RESPONSIVENESS

(71) Applicant: FISHER-ROSEMOUNT SYSTEMS, INC., Round Rock, TX (US)

(72) Inventors: Anthony Amaro, Jr., Cedar Park, TX (US); Mark J. Nixon, Round Rock, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 143 days.

(21) Appl. No.: 17/148,959

(22) Filed: Jan. 14, 2021

(65) Prior Publication Data
US 2022/0221844 A1 Jul. 14, 2022

(51) Int. Cl.
*G05B 19/418* (2006.01)
*H04L 43/10* (2022.01)
(Continued)

(52) U.S. Cl.
CPC ..... *G05B 19/4185* (2013.01); *G05B 19/4183* (2013.01); *G05B 19/4184* (2013.01);
(Continued)

(58) Field of Classification Search
CPC ............ G05B 19/4185; G05B 19/4183; G05B 19/4184
(Continued)

(56) References Cited

U.S. PATENT DOCUMENTS

2006/0025871 A1  2/2006  Khalil et al.
2008/0081579 A1*  4/2008  Chen ................ H04W 4/00
                                                   455/187.1
(Continued)

FOREIGN PATENT DOCUMENTS

WO  WO-2020/047780 A1  3/2020

OTHER PUBLICATIONS

Akerberg et al. ("Measurements on an Industrial Wireless HART Network Supporting PROFIsafe", IEEE, Sep. 2011, pp. 1-8) (Year: 2011).*

(Continued)

*Primary Examiner* — Hien D Khuu
(74) *Attorney, Agent, or Firm* — Marshall, Gerstein & Borun LLP

(57) ABSTRACT

A first component of a process control loop (e.g., a controller or I/O gateway) monitors for and detects performance degradation of a second component of the loop by sending heartbeat messages to the second component via a diagnostic channel different from a control communications channel via which the first and second components communicate control messages for controlling an industrial process. The second component utilizes its control message interpreter to return received heartbeat messages to the first component via the diagnostic channel. The first component detects degradation of the second component when the round trip time (RTT) of a heartbeat message falls outside of an acceptable range of RTTs for the second component, and may suggest or automatically initiate mitigating actions. The first component may determine the average RTT or expected response time of the second component and acceptable range of variations based on a sample number of measured RTTs.

44 Claims, 4 Drawing Sheets

(51) Int. Cl.
   *G06F 1/10*      (2006.01)
   *H04L 43/087*   (2022.01)
(52) U.S. Cl.
   CPC .............. *G06F 1/10* (2013.01); *H04L 43/087* (2013.01); *H04L 43/10* (2013.01)
(58) Field of Classification Search
   USPC ....................................................... 700/117
   See application file for complete search history.

(56) References Cited

U.S. PATENT DOCUMENTS

| | | | |
|---|---|---|---|
| 2008/0170508 A1* | 7/2008 | Popiak ..................... | H04L 1/24 370/252 |
| 2013/0124912 A1* | 5/2013 | Griffith ............... | G06F 11/2005 714/E11.073 |
| 2015/0192907 A1* | 7/2015 | Blevins .................. | G05B 17/02 700/11 |
| 2018/0210428 A1* | 7/2018 | Jundt .................... | G05B 19/414 |
| 2018/0321662 A1* | 11/2018 | Nixon ............... | G05B 19/41845 |
| 2019/0041829 A1 | 2/2019 | Sinha et al. | |

OTHER PUBLICATIONS

Blevins, et al., Wireless Control Foundation: Continuous and Discrete Control for the Process Industry, International Society of Automation, pp. 106-109 (2015).

Office Action for United Kingdom application No. GB21 19027.7, dated Oct. 3, 2022.

* cited by examiner

DETECTING COMPONENT DEGRADATION IN INDUSTRIAL PROCESS PLANTS BASED ON LOOP COMPONENT RESPONSIVENESS

TECHNICAL FIELD

The present application relates generally to industrial process control systems of industrial process plants and, more particularly, to industrial process control systems that are capable of detecting degradations of control loop components.

BACKGROUND

Distributed industrial process control systems, like those used in chemical, petroleum, industrial or other process plants to manufacture, refine, transform, generate, or produce physical materials or products, typically include one or more process controllers communicatively coupled to one or more field devices via physical layers that may be analog, digital or combined analog/digital buses, or that may include one or more wireless communication links or networks. The field devices, which may be, for example, valves, valve positioners, switches and transmitters (e.g., temperature, pressure, level and flow rate sensors), are located within the process environment of the industrial process plant (which is interchangeably referred to herein as a "field environment" or a "plant environment" of the industrial process plant), and generally perform physical process control functions such as opening or closing valves, measuring process and/or environmental parameters such as flow, temperature or pressure, etc. to control one or more processes executing within the process plant or system. Smart field devices, such as the field devices conforming to the well-known FOUNDATION® Fieldbus protocol may also perform control calculations, alarming functions, and other control functions commonly implemented within a process controller.

The process controllers, which may or may not be physically located within the plant environment, receive signals indicative of process measurements made by the field devices and/or other information pertaining to the field devices and execute a control routine, application, or logic that runs, for example, different control modules which utilize different control algorithms make process control decisions, generate process control signals based on the received information and coordinate with the control modules or blocks being performed in the field devices, such as HART®, WirelessHART®, and FOUNDATION® Fieldbus field devices. To perform this communication, the control modules in the process controller send the control signals to various different input/output (I/O) devices, which then send these control signals over specialized communication lines or links (communication physical layers) to the actual field devices to thereby control the operation of at least a portion of the process plant or system, e.g., to control at least a portion of one or more industrial processes running or executing within the plant or system. As such, a process control loop refers to a process controller, one or more I/O devices, and one or more field devices that are controlled by the process controller via signals and/or data delivered to and from the field devices via the I/O devices. The term "process control loop," as utilized herein, is interchangeably referred to as a "control loop" or "loop," and the term "process controller," as utilized herein, is interchangeably referred to as a "controller" or a "control device." Process controllers or control devices may be physical devices or may be virtual devices. For example, one or more logical or virtual process controllers may be assigned to execute or run on a physical host server or computing platform. A process control system may include both physical and virtual process controllers.

The I/O devices, which are also typically located within the plant environment, are generally disposed between a process controller and one or more field devices, and enable communications there-between, e.g., by converting electrical signals into digital values and vice versa. Different I/O devices are provided to support field devices that use different specialized communication protocols. More particularly, in some configurations, a different physical I/O device is provided between a process controller and each of the field devices that uses a different communication protocol, such that a first I/O device is used to support HART field devices, a second I/O device is used to support Fieldbus field devices, a third I/O device is used to support Profibus field devices, etc.

In some configurations, instead of using individual, physical I/O devices to deliver data between process controllers and their respective field devices, an I/O gateway may be disposed between a plurality of process controllers and their corresponding field devices, where the I/O gateway switches or routes I/O data between each of the process controllers and their corresponding field devices. As such, in these configurations, a control loop may include a process controller or control device, the I/O gateway, and one or more field devices. The I/O gateway may communicatively connect to the field devices via various physical ports and connections which support the respective industrial communication protocols that the field devices utilize (e.g., HART, Fieldbus, Profibus, etc.), and the I/O gateway may communicatively connect to the process controllers via one or more communication networks or data highways (e.g., which support wired and/or wireless Ethernet, Internet Protocol (or IP) and/or other types of packet protocols, etc.). The I/O gateway may be implemented at least partially on one or more computing platforms, and may be configured to deliver, route, or switch I/O data between the plurality of process controllers and their respective field devices to thereby perform I/O data delivery for process control. That is, the I/O gateway may allow control devices to exercise control over corresponding one or more field devices by using the networking functionalities provided by the I/O gateway. For example, within the I/O gateway, various I/O data delivery functions, routines, and/or mechanisms may be hosted on one or more servers and utilized to switch I/O data between ports communicatively connecting the control devices with the I/O gateway and ports communicatively connecting the field devices with the I/O gateway.

As utilized herein, field devices, controllers, and I/O devices or gateways are generally referred to as "process control devices." Field devices and I/O devices generally are located, disposed, or installed in a field environment of a process plant. Control devices or controllers may be located, disposed, or installed in the field environment and/or in a back-end environment of a process plant. An I/O gateway is at least partially installed in the field environment, and may be at least partially installed in the back-end environment of the process plant.

Information from the field devices and the process controller is usually made available through the process controllers over the data highway(s) or communication network(s) to one or more other hardware devices, such as operator workstations, personal computers or computing devices, data historians, report generators, centralized databases, or other centralized administrative computing devices that are typically placed in control rooms or other locations away from the harsher field environment of the plant, e.g., in the back-end environment of the process plant. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing process control software, keeping and updating a configuration database, etc. The data highway utilized by the hardware devices and process controllers may include a wired communication path, a wireless communication path, or a combination of wired and wireless communication paths, and typically uses a packet based communication protocol and non-time sensitive communication protocol, such as an Ethernet or IP protocol.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and to download these process control modules via a data highway to dedicated distributed controllers. Typically, these control modules are made up of communicatively interconnected function blocks, which may be objects in an object-oriented programming protocol that perform functions within the control scheme based on inputs thereto and that provide outputs to other function blocks within the control scheme. The configuration application may also allow a configuration engineer to create or change operator interfaces that are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto (or otherwise obtained by the controller) to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

Process control devices and process control loops require large quantities of planning and configuration to ensure the performance and safety of the devices, as well as to ensure the performance and safety of the plant as a whole. Such planning and configuration includes takes into account the response performance or responsiveness of process controllers or control devices. Consider an example of a process plant which heats a volatile chemical (e.g., crude oil or gasoline) to a specific temperature. A control device (e.g., a process controller, a safety system controller, etc.) may be configured to monitor the temperature as fast as once every 50 milliseconds to ensure that the heating of the gasoline does not reach a self-combustible temperature. If at any time the control device detects that the self-combustible temperature has been reached, the control device must react very quickly (e.g., within 50 milliseconds) to lower the intensity of (or shut off) the heating element to prevent the gasoline from exploding, while attempting to maintain the heating of the gasoline at a safe temperature. The heating element controlled by the control device is an example of a "final control element." A final control element typically is a device or component which changes its behavior in response to a control command or instruction to thereby move a value of a controlled variable towards a desired setpoint, and thereby control at least a portion of an industrial process. A final control element may be, for example, a field device which is communicatively connected to the control device via an I/O device or I/O gateway.

The ability of a control device to respond within required parameters may be verified during its initial installation. However, over time, the control device may experience a degradation of response performance or responsiveness, for example, due to software design, lack of computing resources, hardware obsolescence and/or deterioration, interruptions of communications (e.g., below the threshold of being detectable by diagnostic processes), environmental conditions, and the like. Other components of a control loop may similarly degrade. Consequences of such degradations of control loop components may be dire. For example, in the gasoline heating example discussed above, if the control device suffers from a degradation in responsiveness, and/or if the I/O gateway is overloaded, the control loop including the control device, the I/O gateway and the heating element may fail to shut down the heating element within the required amount of time (e.g., within 50 milliseconds), and the heating element would continue to heat the gasoline past the temperature threshold for self-combustion.

In computerized process control systems (e.g., process control systems in which at least some control devices, I/O devices or gateways, and/or other control loop components are implemented on one or more computing platforms and share resources provided by the one or more computing platforms), degradation of the response performance of the control devices, I/O devices or gateways, and/or other control loop components may be particularly impacted by a lack or utilization of hardware and/or software computing resources of the supporting platform(s). For example, lack of CPU (Central Processing Unit) resources, lack of memory, lack of persistent storage space, contention for networking resources, contention for logic resources, and/or other computing resource scarcities at various computing platforms may degrade the performance of the control loop and/or of various components of the control loop.

For example, a virtualized or containerized control device may be assigned to run or execute on a host server or computing platform along with other virtualized/containerized control devices. When too many virtualized control devices run on a single host, the hosted virtualized control devices must contend for CPU, memory and disk resources provided by the host. Even in situations in which overall host CPU availability appears to be sufficient (for example, 30% availability), contention between the virtualized control devices for other types of host resources (e.g., scheduling of control device instances, control device algorithm logic, etc.) may cause a degradation in the control performance of one or more of the virtualized control devices. Further, in configurations in which the virtualized control devices are implemented by using virtual machines, issues such as hypervisor loading and/or CPU utilization may also affect the response performance of the virtual control devices.

In a similar manner, because an I/O gateway may be disposed between a control device and a corresponding final control element, the responsiveness of the control loop may be affected by loading on the I/O gateway and/or contention for network resources (e.g., software and/or hardware network resources) provided by the I/O gateway for I/O data delivery. For example, I/O gateway loading and/or resource contention (e.g., scheduling, I/O data delivery logic, computing resources, etc.) may result in increased latency and/or jitter of the control loop. Moreover, I/O gateway loading and/or resource contention may not only negatively affect control loop performance, but may also negatively affect overall system performance. For example, increased latency introduced by the I/O gateway may degrade the overall operation of the process control system, and increased jitter introduced by the I/O gateway may degrade the performance of the overall control strategy.

Unfortunately, as known diagnostic procedures are typically configured to perform at a much slower rate than process control, and as diagnostic procedures must be configured for particular situations, some types of performance degradations of control loop components may continue undetected for some time. Indeed, some types of degradations of control loop components may only be detected after the control system or process plant experiences a catastrophic event and/or a failure to deliver on a business need. Accordingly, users of the control system may experience the loss of productivity, profit, equipment, capital, and/or even human life due to the delayed and/or undetected performance degradation of control loop components.

SUMMARY

Techniques, systems, and/or method for detecting degradation of industrial process plant components based on loop component responsiveness are disclosed. Generally speaking, the responsiveness of loop components (e.g., of process controllers, safety system controllers, I/O gateway, I/O devices, etc.) may be monitored for degradation as the loop components are operating during run-time to control at least a part of an industrial process. Consequently, degradation of a loop component may be detected as the degradation is starting to occur, rather than after a component hard-fails or when a catastrophic event occurs. The techniques, systems, and methods disclosed herein may alert operating personnel when degradations of loop components are detected. In some embodiments, the techniques, systems, and methods provide for automatic degradation mitigation, so that the detected degradation's impact on system performance and safety may be automatically contained, minimized, or even eliminated.

In an embodiment, a system for detecting component degradation in an industrial process plant includes a first component and a second component of a process control system of the industrial process plant, where the first component and the second component are communicatively connected via a diagnostic channel and via a communication channel. The first component and the second component may be included in a process control loop. For example, the first component may be one of an I/O gateway or a process controller included in a plurality of process controllers communicatively connected via respective communications channels to the I/O gateway, and the second component may be the other one of the I/O gateway or the process controller. The I/O gateway communicatively connects the plurality of process controllers to respective one or more field devices to thereby control an industrial process in a process plant, and The first component of the system is configured to sequentially transmit, via the diagnostic channel, a plurality of heartbeat messages to the second component, and receive, via the diagnostic channel, at least a subset of the plurality of heartbeat messages returned to the first component by the second component upon respective receipt at the second component. The first component of the system is further configured to determine an average response time of the second component based on respective round trip times (RTTs) of the at least the subset of the plurality of heartbeat messages, where the respective RTTs are determined based on respective times of transmission and reception of the at least the subset of the plurality of heartbeat messages at the first component. Still, the first component is further configured to detect a degradation of the second component when an RTT of a subsequent heartbeat message transmitted by the first component to the second component via the diagnostic channel exceeds a threshold corresponding to the average response time of the second component. In some configurations, the first component is additionally or alternately configured to detect a degradation of the second component when the RTT of a subsequent heartbeat message transmitted by the first component to the second component via the diagnostic channel exceeds a threshold corresponding to a periodicity of a module scheduler execution at the second component.

In an embodiment, a method for detecting component degradation in a process control system includes sequentially transmitting a plurality of heartbeat messages from a first component of the process control system to a second component of the process control system via a diagnostic channel. The first component and the second component are communicatively connected via the diagnostic channel and a communications channel, and the first component and the second component may be included in a same process control loop. For example, the first component is one of an I/O gateway or a process controller included in a plurality of process controllers communicatively connected via respective communications channels to the I/O gateway, and the second component is the other one of the I/O gateway or the process controller. The I/O gateway communicatively connects the plurality of process controllers to respective one or more field devices to thereby control an industrial process in a process plant.

The method additionally includes receiving, at the first component from the second component via the diagnostic channel, at least a subset of the plurality of heartbeat messages, where each heartbeat message of the at least the subset of the plurality of heartbeat messages is returned to the first component by the second component upon respective receipt at the second component. Further, the method includes determining, by the first component, an average response time of the second component based on respective round trip times (RTTs) of the at least the subset of the plurality of heartbeat messages. The respective RTTs may be determined based on respective transmission and reception times of the at least the subset of the plurality of heartbeat messages at the first component. Still further, the method includes detecting a degradation of the second component when an RTT of a subsequent heartbeat message transmitted by the first component to the second exceeds a threshold corresponding to the average response time of the second component. In some configurations, the method additionally or alternately includes detecting a degradation of the second component when the RTT of a subsequent heartbeat message transmitted by the first component to the second component via the diagnostic channel exceeds a threshold corresponding to a periodicity of a module scheduler execution at the second component.

DETAILED DESCRIPTION

Figure 1:
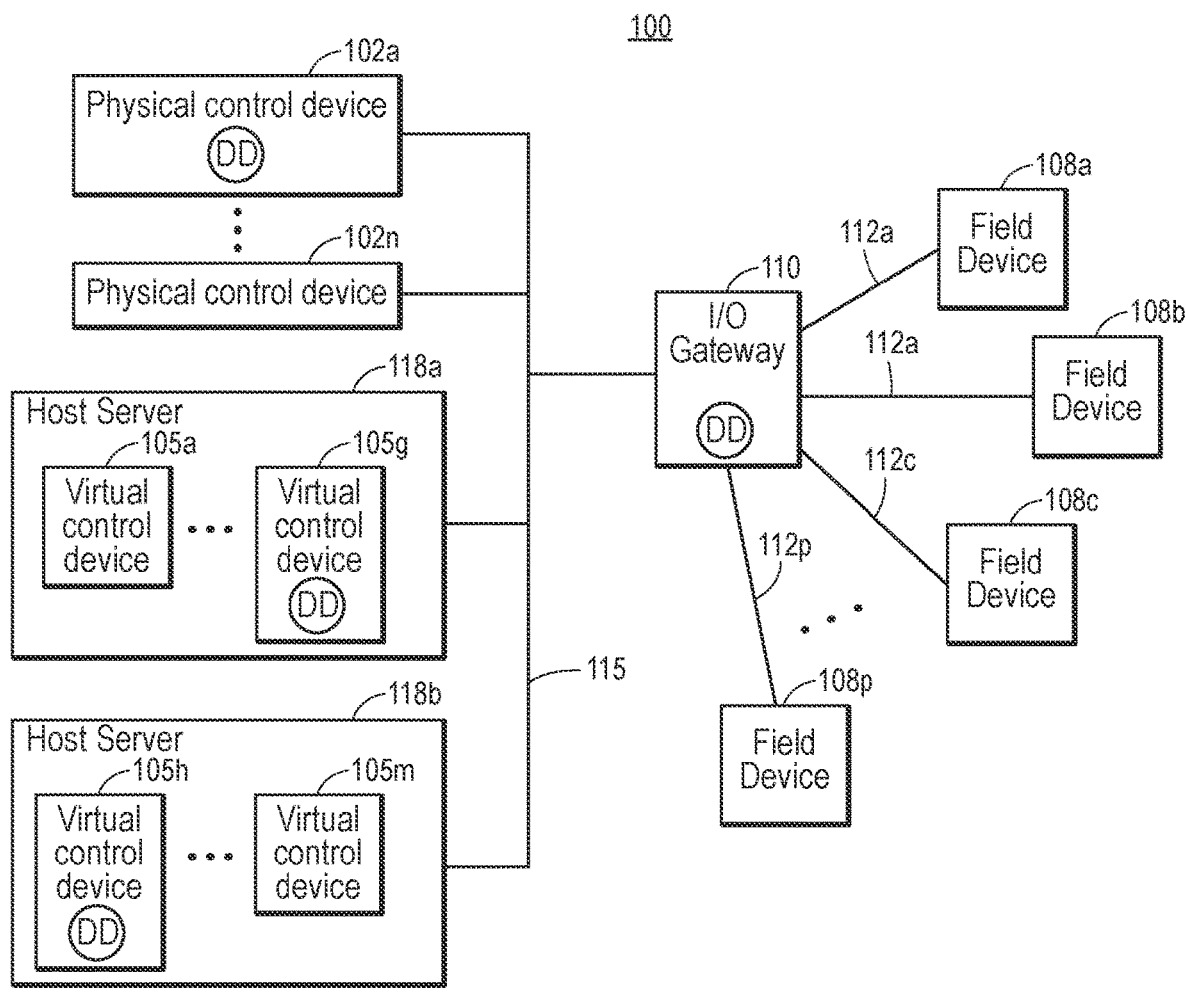
FIG. 1 includes a simplified block diagram of an example portion of a process control system of an industrial process plant configured to detect control loop component degradation.

FIG. 1 is a simplified block diagram of an example portion 100 of a process control system of an industrial process plant. The portion 100 of the process control system depicted in FIG. 1 includes a plurality of controllers 102a-102n, 105a-105m which are communicatively connected to a plurality of field devices 108a-108p via an I/O gateway 110 (which is also interchangeably referred to herein as an "I/O server 110"). The controllers 102a-102n, 105a-105m, I/O gateway 110, and field devices 108a-108p cooperatively operate, during run-time of the industrial process plant, to control an industrial process of the industrial process plant. Other components of the process control system, such as the configuration database and other centralized databases, communication network architecture components, diagnostic and other tools, operator and engineer user interfaces, administrative computing devices, etc. are not depicted in FIG. 1 for ease of illustration (and not limitation) purposes.

At least some of the field devices 108a-108p may be a final control element such as a heater, pump, actuator, sensor, transmitter, switch, etc., and each field device is communicatively connected to the I/O gateway 110 via one or more respective wired and/or wireless links 112a-112p. Links 112a-112p are configured to safely operate in the harsh field environment of the process plant. The I/O gateway 110 is communicatively connected to each of the controllers 102a-102n, 105a-105m via a data highway 115, which may be implemented by utilizing one or more suitable high capacity links, such as Ethernet, high-speed Ethernet (e.g., 100 M Gigabit Ethernet), optical links, and the like. The data highway 115 may be include one or more wired and/or wireless links, for example. In some configurations, at least one of the links 112a-112p to the field devices 108a-108p and/or the data highway 115 supports Advanced Physical Layer (APL) transport technology which, in turn, supports one or more protocols to thereby enable the intrinsically safe connection of field devices, other devices, other various instruments, and/or other equipment located in remote and hazardous locations such as the field environment of the process plant.

The plurality of controllers 102a-102n, 105a-105m (also referred interchangeably herein as "control devices" or "controllers") may include one or more physical controllers 102a-102n, and/or may include one or more logical or virtual controllers 105a-105m, where each controller 102a-102n, 105a-105m executes one or more respective control routines, control modules, or control logic to thereby control a respective portion of the industrial process during run-time operations of the plant. For example, some of the controllers 102a-102n, 105a-105m may be process controllers which execute respective portions of the run-time control strategy of the industrial process plant. Some of the controllers 102a-102n, 105a-105m may be safety controllers which operate as part of a Safety Instrumented System (SIS) supporting the process plant.

Each logical or virtual controller 105a-105m may be a respective virtualized, containerized, or other type of logical control device which executes or runs on a respective host server or computing platform 118a, 118b. The set of host servers 118a, 118b may be implemented by using any suitable host server platform, such as a plurality of networked computing devices, a server bank, a cloud computing system, etc. Each server 118a, 118b may host a respective one or more logical control devices 105a-105m. For example, a logical control device 105a-105m may be implemented via a container, and the container may be assigned to execute on a particular host server, and/or a logical control device 105a-105m may be implemented by a virtual machine running within a hypervisor at a particular host server.

As previously mentioned, the I/O gateway 110 is communicatively connected to the field devices via various physical ports and connections 112a-112p which support the respective industrial communication protocols that the field devices utilize (e.g., HART, Fieldbus, Profibus, etc.), and the I/O gateway 110 communicatively connects to the process controllers 102a-102n, 105a-105m via one or more communication networks or data highways 115, which may support wired and/or wireless Ethernet, Internet Protocol (or IP) and/or other types of packet protocols, etc. The I/O gateway 110 may be implemented at least partially on one or more computing platforms, and may be configured to deliver, route, or switch I/O data between the plurality of process controllers 102a-102n, 105a-105m and their respective field devices 108a-108p to thereby execute respective control logic to perform process control. For example, within the I/O gateway 110, various I/O data delivery functions, routines, logic, and/or mechanisms may be hosted on one or more servers and utilized to switch I/O data between ports communicatively connecting the control devices 102a-102n, 105a-105m with the I/O gateway 110 and ports communicatively connecting the I/O gateway 110 with the field devices 108a-108p. In an embodiment, each control device 102a-102n, 105a-105m may be a respective client of the I/O gateway 110, for which the I/O gateway 110 services respective I/O data delivery requests. Various hardware and/or software resources of the I/O gateway 110 (e.g., CPU resources, memory resources, persistent storage space, disk space, network resources, logic resources, computing resources, etc. of the computing platforms supporting the I/O gateway 110) may be shared to service requests of multiple clients.

The portion 100 of the process control system depicted in FIG. 1 includes one or more process control loops (also referred to interchangeably herein as "control loops" or "loops"), each of which includes a physical 102x or a virtual 105y controller, the I/O gateway 110, and at least one field device 108z, which are generally referred to herein as the "components" of the control loop. For example, components of a first control loop may include the physical control device 102a, the I/O gateway 110, and the field device 108a; components of a second control loop may include the physical control device 102b, the I/O gateway 110, and the field device 108b; components of a third control loop may include the virtual control device 105g, the I/O server 110, and the field device 108c; and components of a fourth control loop may include the virtual control device 105m, the I/O gateway 110, and the field device 108p. The components and control logic of each control loop may be defined or configured within the process control system, and the control device of each loop is configured with respective control routines or control logic which the control device executes during run-time operations. Typically, a particular final control element or field device 108a-108p may be configured or assigned to be exclusively controlled by only one control device 102a-102n, 105a-105m. Also typically, but not necessarily, a particular control device 102a-102n, 105a-105m may be configured or assigned to control multiple final control elements or field devices 108a-108p. In a general sense, within a control loop, the controller 102a-102n, 105a-105m receives one or more input signals from the one or more field devices 108a-108p, one or more other controllers 102-102n, 105a-10m, and/or one or more other devices within the process plant (e.g., via the data highway 115 and the I/O gateway 110), applies one or more control routines or control logic to the input signals to generate one or more output signals, and transmits the output signal(s) to one or more field devices 108 of the control loop (e.g., via the data highway 115 and the I/O gateway 110) to thereby change the behavior of the field devices 108, and thereby control at least a portion of the industrial process. In some configurations, the controller 102a-102n, 105a-105m also transmits one or more output signals to one or more other controllers 102a-102n, 105a-105m also for the purposes of controlling the industrial process.

Some of the control loop components illustrated in FIG. 1 are particularly configured to detect degradation of one or more other components which are included in its loop, and are indicated as such in FIG. 1 by an encircled "DD." For example, as shown in FIG. 1, control devices 102a, 105g, and 105h are particularly configured to detect degradation of the I/O gateway 110, and the I/O gateway 110 is particularly configured to detect degradation of any number of the control devices 102a-102n, 105a-105m.

Figure 2A:
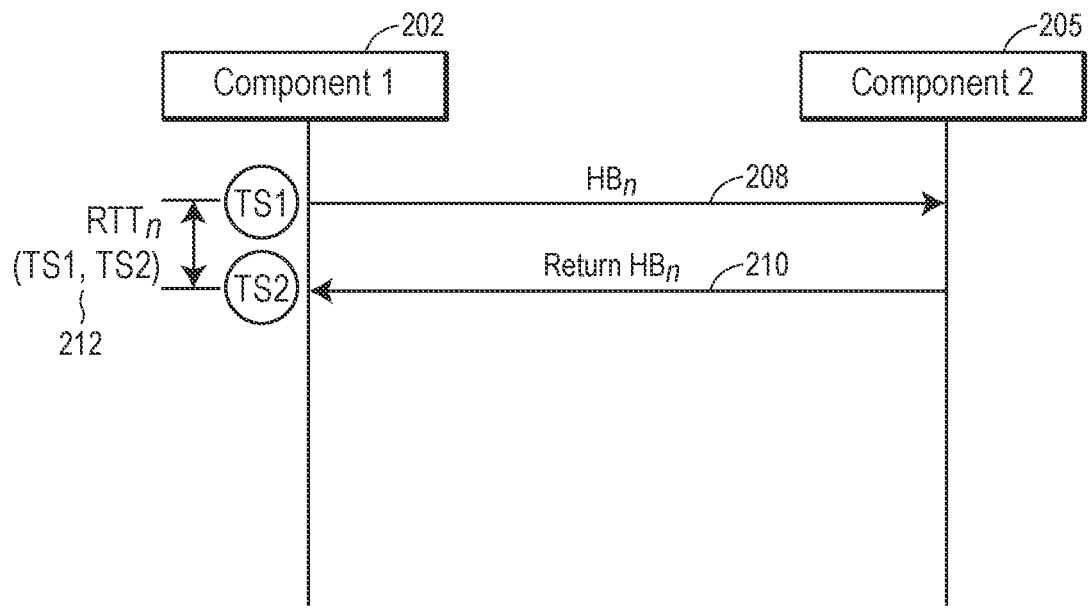
FIG. 2A depicts an example message flow for detecting degradation of a control loop component.

To illustrate, FIG. 2A depicts an example message flow 200 for detecting degradation of a control loop component. For ease of illustration, and not for limitation purposes, FIG. 2A is discussed herein with simultaneous reference to FIG. 1. In FIG. 2A, a first loop component 202 and a second loop component 205 are configured to be included in the same control loop, and are communicatively connected via a communication channel, such as a communication channel of the data highway 115. For example, the first component 202 may be one of the physical or logical controllers 102a-102n, 105a-105m and the second component 205 may be the I/O gateway or server 110, or the first component 202 may be the I/O gateway or server 110 and the second component 205 may be one of the physical or logical controllers 102a-102n, 105a-105m.

The first component 202 and the second component 205 are also communicatively connected via a diagnostic channel, which may be another channel of the data highway 115 different than the communications channel. Generally, the first and second components 202, 205 transmit and receive control and communications messages or signals to each other to execute the control strategy of the control loop via the communications channel and not via the diagnostic channel, and the first and second components 202, 205 transmit and receive diagnostic messages or signals (including messages/signals related to detecting component degradation) to each other via the diagnostic channel and not via the communications channel. In an embodiment, the diagnostic channel communicatively connecting the first and second components 202, 205 is utilized by only the first and second components 202, 205 of the control loop included in the process control system and is not utilized during by any other components or devices of the process control system. That is, in this embodiment, the diagnostic channel is a channel which is dedicated for use by only the first and second components 202, 205, and is not shared by any other components or devices. The communications channel communicatively connecting the first and the second control loop components 202, 205 may be a dedicated channel or a shared channel.

The message flow 200 depicts messages that are delivered between the first component 202 and the second component 205 of the process control loop via the diagnostic channel to detect degradation of the second component 205. As such, the first component 202 may be considered to be a monitoring or degradation detecting component, and the second component 205 may considered to be a monitored or target component which the first component 202 monitors for degradation. As shown in FIG. 2A, the first component 202 sequentially transmits a plurality of heartbeat messages HBn 208 (which are interchangeably referred to herein as "requests 208") over time to the second component 205. For example, the first component 202 may sequentially transmit the plurality of heartbeat messages HBn or requests 208 periodically, non-periodically, randomly, during times of relative hardware and/or software resource availability of the first component 202, on demand or per user instruction, and/or at other suitable times. Each heartbeat message HBn 208 may be distinguished from other heartbeat messages HBn 208 via a respective identifier such as number, count, alphanumeric character, etc. In embodiment, the heartbeat message identifiers may increment and cyclically repeat, e.g., n=1, 2, 3, . . . , x, 1, 2, 3, . . . , x . . . , and so on. At the second component 205, upon receipt of the heartbeat message HBn 208, the second component 205 forwards or otherwise returns the received heartbeat message HBn back to the first component 202, as denoted by the reference 210 (which is referred to interchangeably herein as a "response 210"). For example, the second component 205 may receive the incoming heartbeat message HBn or request 208 via the diagnostic channel, process the heartbeat message HBn or request 208 via the module or sub-component of the second component 205 which processes incoming and outgoing process control and communication messages, and forward or return the heartbeat message HBn or response 210 to the first component 202 via the diagnostic channel at a fastest update rate supported by the second component 205. For example, when the second component 205 is a control device 102a-102n, 105a-105m, upon receiving the request 208 at the control device 102a-102n, 105a-105m, a response module executed within the control execution scheduler of the control device 102a-102n, 105a-105m sends the return heartbeat message HBn or response 210 to the first component 202. In another example, when the second component 205 is the I/O gateway 110, upon receiving the request 208 at the I/O gateway 110, an RTT test initiator at the I/O server 110 sends the return heartbeat message HBn or response 210 to the first component 202. That is, the I/O gateway 110 treats the incoming heartbeat message HBn 208 as if the I/O gateway 110 were forwarding an I/O command, albeit that the "forwarding" includes looping the heartbeat message HBn or request 208 back to the first component 202 as a response 210.

The first component 202 tracks a respective time at which it transmitted each heartbeat message HBn or request 208, and a respective time at which it receives the corresponding return heartbeat message HBn or response 210, e.g., via time stamps TS1, TS2 as shown in FIG. 2A, or via any other suitable mechanism. Based on the time stamps TS1, TS2, the first component 202 determines a respective round trip time (RTTn) 212 of the heartbeat message HBn delivered between the first component 202 and the second component 205. The RTTn 212 may be analogous to the time interval, within a process control loop that includes a physical I/O device or I/O card instead of an I/O gateway 110, from a control device sending an output command for I/O to the I/O device to when the control device receives a corresponding confirmation return from the I/O device.

In an embodiment in which the first component 202 is a physical control device 102a-102n or is the I/O gateway 110, a hardware clock of a processor of the first component 202 may be utilized to determine the time stamps TS1, TS2. In an embodiment in which the first component 202 is a logical control device 105a-105m and the second component 205 is the I/O gateway 110, though, using the logical control device 105a-105m to determine the time stamps TS2, TS2 may be inaccurate and inconsistent, at least due to nature of virtual machines running in hypervisors and/or of hosted architectures. In these embodiments, time stamps TS1, TS2 may be determined in a manner such as illustrated in FIG. 2B.

Figure 2B:
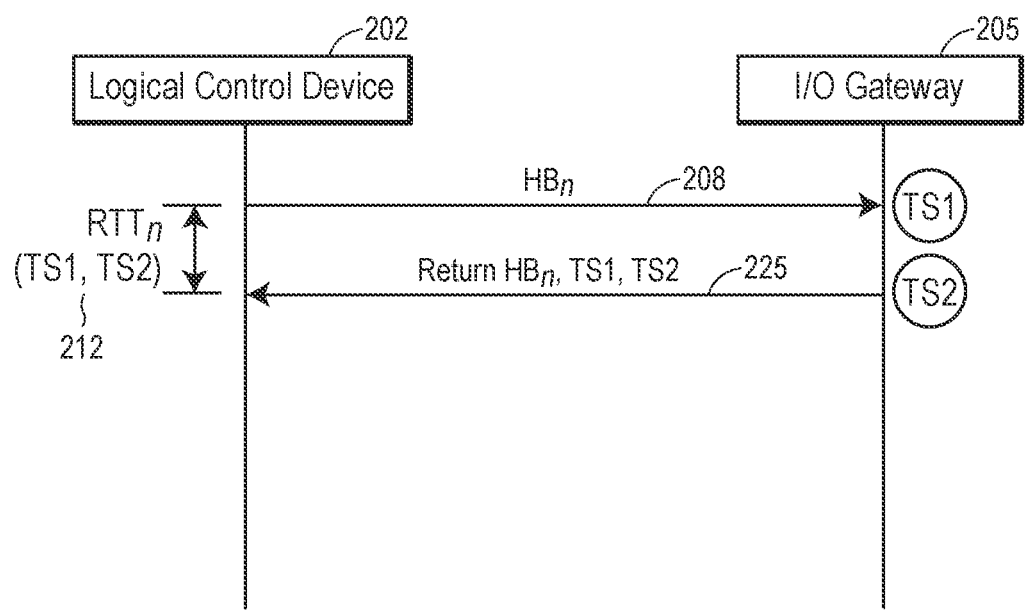
FIG. 2B depicts an example message flow for detecting degradation of a control loop component.

FIG. 2B depicts an example message flow 220 for detecting degradation of a control loop component. In FIG. 2B, the first loop component 202 is a logical control device 105a-105m and the second loop component 205 is the I/O gateway or server 110. Similar to FIG. 2A, the messages within the message flow 220 are delivered between the first and the second components 202, 205 via a diagnostic channel. Also similar to FIG. 2A, the logical control device 202 sequentially transmits a plurality of heartbeat messages HBn 208 to the I/O gateway 110. As the I/O gateway 205 includes a processor which has a hardware clock, the I/O gateway 205 may serve as a proxy for the logical control device 202 for the purposes of determining respective time stamps TS1, TS2 corresponding to each received heartbeat message HBn. For example, the I/O gateway 205 may determine the time of a receipt of the heartbeat message HBn at the I/O gateway 205 as TS1, and the I/O gateway 205 may determine TS2 to be the time immediately prior to the I/O gateway 110 returning the received heartbeat message HBn 225 to the logical control device 202. The I/O gateway 205 may send TS1 and TS2 to the logical control device 202 in conjunction with the return heartbeat message HBn 225 (e.g., by inserting TS1 and TS2 into the return heartbeat message HBn 225, or by associating another transmission including TS1 and TS2 with the heartbeat message HBn 225), and the logical control device 202 may utilize the received time stamps TS1, TS2 to determine the corresponding round trip time RTTn 212 of the heartbeat message HBn.

At any rate, whether the message flow 200 or the message flow 220 is utilized, in an embodiment, after a threshold or minimum number of sample RTTs have been obtained or determined by the first component 202 during a quiescent or normal running or operating state of the process control system 100, the first component 202 determines an average or baseline RTT for heartbeat messages that are transmitted between the first and second components 202, 205, and optionally may determine a corresponding standard deviation. The threshold or minimum number of sample RTTs utilized to determine the average or baseline RTT may be pre-defined or pre-configured, and may be dynamically adjustable, e.g., automatically and/or manually. The average or baseline RTT between the first and the second components 202, 205 and the standard deviation may be stored at the first component 202. Generally speaking, the average or baseline RTT may provide a measure, level, or indication of an expected or steady-state response or reaction time of the second component 205 during a quiescent or normal running or operating state of the control system 100. The corresponding standard deviation may indicate a range of RTTs (e.g., the average RTT minus one standard deviation to the average RTT plus one standard deviation) during which a response rate or reaction time of the second component 205 is considered to be deterministic or operating in a suitable performance range, e.g., a range of acceptable RTTs. As such, a comparison of a subsequently measured or calculated RTTn 208 with the average or baseline RTT and corresponding standard deviation may be indicative of a measure of a response performance level of the second component 205. For instance, measured RTTs which fall within plus or minus one standard deviation of the average or baseline RTT may be considered to be acceptable RTTs, and measured RTTs which fall outside of plus or minus one standard deviation of the average or baseline RTT may be considered to be unacceptable RTTs, which may be indicative of degradation at the second component 205.

Alternatively, in another embodiment in which the target or second component 205 is a control device 102a-102n, 105a-105n, an acceptable RTT may be defined to be an RTT which is less than or equal to one Quanta time period (e.g., less than or equal to a length of a periodicity) of the control device's module scheduler execution. The threshold limit for an acceptable RTT (e.g., a "periodicity-based threshold") may be pre-defined or pre-configured, and may be adjustable. For example, a user may set the periodicity-based threshold to a percentage between 90% of the length of the periodicity of the module scheduler execution up to and including 100% of the length of the periodicity. As such, in this embodiment, any measured RTT which is less than or equal to the periodicity-based threshold may be an acceptable RTT for the target control device 205, and any measured RTT which is greater than the periodicity-based threshold may be an unacceptable RTT for the target control device 205.

At any rate, after determining and storing the average or baseline RTT of the target component 205 (and corresponding standard deviation), and/or after storing the periodicity-based threshold of the target component 205, the first component 202 continues to transmit heartbeat messages HBn or requests 208 to the second component 205, receive corresponding return heartbeat messages HBn or responses 210, determine or calculate corresponding round trip times RTTn 212, and compare the determined or calculated round trip times RTTn 212 with the stored average RTT and standard deviation and/or with the periodicity-based threshold, as the case may be. For example, an RTTn 212 which falls outside of the range of acceptable RTTs around the baseline RTT for the second component 205 (e.g., an unacceptable RTT) indicates that the second component 205 is exhibiting non-deterministic behavior, and therefore may be suffering from performance degradation. In another example, for a second component 205 which is a control device 102a-102n, 105a-105m, an RTTn 212 which exceeds the periodicity-based threshold for the second component 205 (e.g., an unacceptable RTT) indicates that the second component is 205 exhibiting non-deterministic behavior, and may be suffering from performance degradation. When the first component 202 observes a statistically significant number of unacceptable RTT measurements of the second component 205, the observation may indicate that the second component's execution health may be degrading or has degraded. For example, when the second component is a control device 102a-102n, 105-105m, the observation may indicate that the module scheduler of the control device 102a-102n, 105a-105m is not able to meet the control determinism of the periodicity of its corresponding control modules.

Referring to the process control system 100 illustrated in FIG. 1, performance degradation in the physical control devices 102a-102n may be caused by deterioration of hardware components and/or software components. For example, deterioration of hardware and/or software components of the physical control devices 102a-102n may be caused by incorrect automatic or manual loading of control logic into the control devices 102a-102n, excessive interrupt load, cache memory failure (thereby leading to full memory accesses, which are slower than accessing cache memory), denial of service attacks, extreme environmental conditions (e.g., excessive heat or cold) which may alter the quality of execution of the control devices 102a-102n, and excessive radiation exposure which may flip or change bits of instruction data thereby causing incorrect software operation, to name a few.

Performance degradation of more computerized components of the control loop, such as the logical control devices 105a-105m and the I/O gateway 110, may be impacted by a lack of hardware and/or software computing resources of supporting computing platforms, as such resources may be shared resources. For example, hardware and software resources of each host server 118a, 118b may be shared by a respective set of virtual control devices 105a-105g, 105h-105m executing thereon. As such, each virtual control device 105a-105g, 105h-105m executing on is respective host server 118a, 118b must contend with other virtual control devices 105a-105g, 105h-105m executing on the host server 118a, 118b for host server resources. Accordingly, a lack of hardware resources such as CPU resources, memory, and/or persistent storage space, as well as contention for software resources such as networking resources, logic resources, and/or other computing resources at each host server 118a, 118b may degrade the performance of one or more virtual control devices 105a-105g, 105h-105m executing respectively thereon.

Performance degradation of the I/O gateway 110 may be affected by loading on the I/O gateway 110 and/or contention for network resources (e.g., software and/or hardware network resources) which are provided by the I/O gateway 110 for delivery of I/O data to and from multiple control devices 102a-102n, 105a-105m. For example, I/O gateway loading and/or resource contention for servicing clients of the I/O gateway 110 (e.g., for scheduling, I/O data delivery logic, computing, etc.) may result in increased latency and/or jitter. Moreover, I/O gateway loading and/or resource contention may not only negatively affect the performance of various control loops, but may also negatively affect the overall performance of the process control system. For example, increased latency introduced by the I/O gateway 110 may degrade the overall operation of the process control system, and increased jitter introduced by the I/O gateway 110 may degrade the performance of the overall control strategy.

In any case, upon determining, by the first component 202, that a particular RTTn 212 falls outside of the range of acceptable RTTs around the baseline RTT for the second component 205, and/or falls above the periodicity-based threshold of acceptable RTTs for the second component 205, the first component 202 may notify operating personnel that the second component 205 is experiencing non-deterministic behavior indicative of performance degradation, which may lead to unpredictable results within the process control system. For example, the first component 202 may cause an alert or an alarm to be generated and displayed at one or more operator interfaces of the process control system.

Additionally or alternatively, the first component 202 may determine one or more mitigating actions in response to the detected degradation of the second component 205. For example, when the second component 205 is a control device 102a-102n, 105a-105m, the first component 202 (in this example, the I/O gateway 110) may determine the one or more mitigating actions to include adjusting the load of the control device 102a-102n, 105a-105m, decreasing the rate of execution of the control logic within the control device 102a-102n, 105a-105m, or determining and initiating a modification to the control logic of the control device 102a-102n, 105a-105m. When the second component 205 is a logical control device 105a-105m, the one or more mitigating actions may include migrating the logical control device 105a-105m to another, less loaded host server, re-balancing a load of the host server among the virtual control devices supported by the host server, re-balancing of a load distribution among a plurality of host servers, etc. For example, actions to mitigate detected degradation of logical control devices 105a-105m may include modifying a load of one or more CPUs of one or more of the host servers, modifying a memory usage of one or more of the host servers, and/or modifying a disk space usage of one or more of the host servers.

In another example, when the second component 205 is the I/O gateway 110, the first component 202 (in this example, a physical control device 102a-102n or a logical control device 105a-105m) or some other device of the system 100 may determine one or more actions to mitigate degradation of the I/O gateway 110 to include, for example, decreasing the reporting rate of the I/O gateway 110, decreasing the number of clients serviced by the I/O gateway 110, slowing the update rate of I/O with respect to one or more clients serviced by the I/O gateway 110, otherwise modifying a load of the I/O gateway 110, etc. For example, actions to mitigate detected degradation of the I/O gateway 110 may include modifying a load of one or more CPUs of the I/O gateway 110, modifying a memory usage of the I/O gateway 110, and/or modifying a disk space usage of the I/O gateway 110.

In an embodiment, the first component 202 may cause the determined mitigating action(s) to be presented to operating personnel at one or more operator interfaces as recommended and/or selectable options. Upon operator selection of one or more of the presented options, the process control system may execute the selected options. In another embodiment, upon determining the one or more mitigating action(s), the first component 202 may cause the process control system to automatically initiate and execute at least one of the determined mitigating actions, e.g., without requiring any user input, and optionally may notify operating personnel of the automatically-executed mitigating action. Whether a particular mitigating action is to be automatically or manually executed may be pre-configured, if desired. As such, the process control system may cause at least some of the issues which are causing performance degradation of the component 205 to be mitigated and corrected (either manually or automatically) as the performance degradation is detected, rather than having to wait until an undesirable or disruptive event occurs. As such, the techniques described within this disclosure are able to provide earlier detection, warning, and even automatic mitigation of process control loop component degradation as compared to presently known techniques.

In some implementations, the occurrence of a single RTT may not in and of itself trigger an alarm, alert, or mitigating action. For example, upon receiving an unacceptable RTT, the first component 202 may wait for a given time interval and/or for a given number of additional heartbeat messages HBn to be sent/received to determine whether or not the unacceptable RTT is an anomaly or a trend, and only after the trend is confirmed (e.g., after receiving a statistically significant number of unacceptable RTTs) does the first component 202 generate the alert, alarm, and/or mitigating action(s). The given time interval, the given number of additional heartbeat messages HBn, and/or other information utilized to determine or confirm a statistically significant trend may be pre-configured, and may be adjustable.

When the target or monitored component 205 is the I/O gateway 110, a group of RTTs respectively observed by a group of control devices or first components 202 (whether physical 102a-102n, logical 105a-105m, or both physical and logical) may be utilized to monitor and detect degradation of the I/O server 110. For example, one of the control devices in the group of first components 202 (or another node which is connected to the data highway 115) may collect a record of abnormal RTTs observed among the group of first components 202. Upon exceeding one or more predetermined thresholds (corresponding to, for example, a rate of abnormal RTTs observed among the group of first components 202 over a given time interval, a percentage of the group of first components 202 which are experiencing abnormal RTTs, variances in abnormal RTTs observed by the group of first components 202 over a particular time interval, rates of occurrences of said variances, and/or other suitable thresholds), the process control system may generate an alert or alarm indicative of a performance degradation of the I/O server 110, and may automatically determine, recommend, and/or initiate one or more mitigating actions. For instance, a high rate of variances in the RTTs observed by the group of first components 202 may be indicative of increased jitter introduced by the I/O server 110, which may be caused by increased contention for computing resources of the I/O server 110 and may negatively affect performance of the control strategies being executed by the process control loops via the I/O server 110. A large increase in durations of RTTs among the group of first components 202 may be indicative of increased latency at the I/O server 110, which may be caused by increased loading of the I/O server 110 and may negatively affect overall process control system performance. Accordingly, the process control system may determine, recommend, and/or initiate one or more suitable mitigating actions, such as decreasing the reporting rate of the I/O gateway 110, decreasing the number of clients serviced by the I/O gateway 110, slowing the update rate of I/O with respect to one or more clients serviced by the I/O gateway 110, modifying a load of one or more CPUs of the I/O gateway 110, modifying a memory usage of the I/O gateway 110, modifying a disk space usage of the I/O gateway 110, and/or otherwise modifying allocations of resources of the I/O gateway 110.

In some embodiments, the process control system may aggregate RTTs which are observed by the plurality of controllers 102a-102n, 105a-105m, and/or the I/O gateway 110 to determine a score which is indicative of an overall health of the process control system or portion thereof. For example, RTTs of physical control devices 102a-102n determined by the I/O gateway 110 may be aggregated and used to determine corresponding latency and jitter of the physical control devices 102a-102n as a group, to thereby determine a score or indication of the overall health of the set of physical control devices 102a-102n as a whole. RTTs of logical control devices 105a-105m determined by the I/O gateway 110 may be aggregated and used to determine corresponding latency and jitter of the logical control devices 105a-105m as a group, to thereby determine a score or indication of the overall health of the logical control devices 105a-105m as a whole. Further, as discussed above, RTTs of the I/O gateway 110 determined by the plurality of control devices 102a-102n, 105a-105m may be aggregated and utilized to determine corresponding latency and jitter of the I/O gateway 110, which may be in turn utilized to determine a score or indication of the overall health of the I/O gateway 110.

In particular, when the I/O gateway 110 is the target or monitored component 205, an average or overall RTT may be indicative of the communications delay time introduced by the I/O server 110 while the I/O server 110 forwards messages from the control devices 102a-102n, 105a-105m and the final control elements 108a-108p, and vice versa. As such, the average or overall RTT of the I/O server 110 (e.g., the control delay introduced by the I/O server 110 as a whole) may be determined from a plurality of RTTs measured by a plurality of control devices 102a-102n, 105a-105m. A minimum total number of control devices 102a-102n, 105a-105m which measure respective RTTs of the I/O server 110 from which the average or overall RTT of the I/O server 110 is determined may be pre-defined and/or adjustable; however, for the most accurate estimate of the overall RTT of the I/O server 110, the respective RTTs measured by a majority or even all of the control devices 102a-102n, 105a-105m may be averaged to determine the overall RTT of the I/O server 110. For example, one of the control devices 102a-102n, 105a-105m or another device of the process control system 100 may determine the overall RTT of the I/O server 110 from the RTTs measured by the plurality of control devices 102a-102n, 105a-105m.

Further, as the overall RTT of the I/O server 110 is dependent on the engineering of control loops which utilize the I/O server 110 for I/O delivery, the average health of the I/O server 110 may be determined by comparing a run-time average or overall RTT with a baseline average or overall RTT which was obtained while the control system 100 was operating in a quiescent or normal running state. A threshold corresponding to a maximum acceptable difference between a run-time, measured average RTT and the baseline average RTT (e.g., a "difference threshold") may be utilized to identify acceptable and unacceptable average or overall RTTs of the I/O server 110. As such, differences between measured average or overall RTTs of the I/O server 110 and the baseline average or overall RTT of the I/O server 110 which are greater than the difference threshold may be indicative of unacceptable degradation of the performance of the I/O server 110. The difference threshold may be defined with respect to control module execution periods, for example, X % of the control module execution rates, and/or based on other criteria. The difference threshold may be pre-defined or pre-configured, and may be adjustable.

In some configurations, the control system 100 may include a plurality of chained I/O servers 110 which collectively operate as a single, logical I/O server to deliver messages between control devices 102a-102n, 105a-105m and final control elements 108a-108p (not shown). In these configurations, the overall RTT or control delay contributed by the chain of I/O servers 110 may be determined by aggregating or cumulatively adding the respective RTTs of each of the chained I/O servers 110. Differences between measured RTTs of the chain of I/O servers 110 may be compared to an average or baseline RTT of the chain of I/O servers 110 to detect any degradation within the chain, e.g., in a manner similar to that of a single I/O server 110 discussed above.

Moreover, the respective RTTs of each of the chained I/O servers 110 may be compared against the respective baseline RTTs of each of the chained I/O servers 110 to identify or narrow sources of control delay to specific I/O servers 110 within the chain. For example, if the difference between the run-time RTT and a baseline RTT of a first I/O server 110 in the chain exceeds a respective difference threshold, while the difference between the run-time RTT and a baseline RTT of a second I/O server 110 in the chain does not exceed a respective difference threshold, the first I/O server 110 may be identified as a potential source of control delay within the chain of I/O servers 110, and suitable mitigating actions may be taken for the first I/O server 110.

As previously discussed, the measured RTT of an I/O server 110 (or of a chain of I/O servers 110) may be indicative of a communications delay introduced by the I/O server 110 in control loops. To illustrate, in an example, the monitoring device 202 may be a control device 102a which drives the actions of a valve 108a by sending a message to the valve 108a every 500 milliseconds (ms) via the I/O server 110. The control device 102a (e.g., the monitoring device 202) may conduct an RTT test on the I/O server 110 (e.g., the target or monitored device 205), and the measured RTT of the RTT test may be 100 ms. As such, the communications delay introduced by the I/O server 110 in the control loop (e.g., the control loop including the control device 102a, the I/O server 110, and the valve 108a) may be 100 ms. Accordingly, the overall time for the control device 102a to receive an input from the I/O server 110, calculate a new valve position, and drive the new valve position via a corresponding signal to the valve 108a may be delayed by an additional 100 ms due to the communications delay introduced by the I/O server 110.

The amount of communications delay introduced by the I/O server 110 (e.g., the overall or average measured RTT, e.g., as described above) may be stored in a parameter (e.g., a "I/O server communications delay parameter") within the control system 100 and utilized to hone or refine the operations of control loops which utilize the I/O server to account for the communications delay. For example, in the example control loop including the control device 102a, the I/O server 110, and the valve 108a, an indication of the value of the I/O server communications delay parameter may be included in time-to-apply field included in the control signal (e.g., the output of the control device 102a) which is communicated to the valve 108a to control the behavior of the valve 108a. As such, in this example, the control or output signal sent to the valve 108a includes both an indication of the new/updated target valve position (e.g., as determined by the control device 102a), and the time-to-apply field including the indication of the value of the I/O server communications delay parameter. Accordingly, the content of the time-to-apply field indicates the time at which the valve 108a is to act on the indicated new/updated target valve position, e.g., the time at which the new/updated target valve position is to take effect at the valve 108a. As such, the timing of position changes of the valve 108a takes into account the communications delay introduced by the I/O server 110.

In an example implementation, the valve 108a is a wireless valve 108a, and the control or output signal generated by the control device 102a to drive the valve 108a may be a WirelessHART command (or another type of wireless signal) including an indication of the new/updated target valve position, and including a time-to-apply field populated with an indication of the value of the I/O server communications delay parameter. As such, upon receiving the command generated by the control device 102a, the valve 108a may delay acting on the new/updated target valve position in accordance with the value of the time-to-apply field. Additionally, the valve 108a may populate its READBACK parameter with the new/updated target valve position delayed by the value of the time-to-apply field. As such, the READBACK parameter value reflects the target valve position independent of communications delay. Consequently, if the READBACK parameter value begins to vary more widely over time, the wider variations may indicate that the valve 108a is performing differently, and may need to be assessed.

In some situations, a wireless gateway (via which the WirelessHART or other type of wireless command is transmitted to the wireless valve 108a) may utilize the value of the time-to-apply field to maintain a common sense of time among devices of the wireless network, e.g., by distributing or redistributing time slots among the devices of the wireless network based on the value of the time-to-apply field. Of particular note, as the I/O server communications delay parameter value is determined based on a statistically significant number of RTT measurements, changes in the value may be indicative of changes in the loading of the I/O server 110 and/or changes in resource contention at the I/O server 110. As such, as the time-to-delay field value is determined based on the I/O server communications delay parameter value, providing the time-to-delay field value to the final control elements (e.g., of the valve 108a) may allow the final control elements to be responsive to the changing conditions of the I/O server 110. That is, the behavior of the final control elements (e.g., of the valve 108a) may automatically adjust or adapt to accommodate for changes in the loading and/or resource usage at the I/O server 110. Further, and advantageously, as changes in the I/O server communications delay value are indicative of changes in the performance of the I/O server 110, the value of the I/O server communications delay value and its variations may be monitored to easily detect any degradation or performance issues of the I/O server 110.

Additionally, in some implementations of the message flow 200 and/or of the message flow 220, RTTs observed by various components 102a-102n, 105a-105m, and 110 of the process control loops may be utilized to monitor and determine the utilization of computing resources within the process control loops and/or within the process control system. Computing resource utilization may be measured, for example, by one or more standard API calls to an underlying operating system of the target or monitored device 205, and the computing resource utilization information obtained via the one or more standard API calls may be included in a return heartbeat message HBn or response 210 sent by the target or monitored device 205 to the monitoring device 202. When the target or monitored device 205 is the I/O server 110 or a logical control device 105a-105m, other computing resource utilization information of the I/O server 110 (e.g., network bandwidth, CPU availability or usage, memory availability or usage, etc.) may be additionally or alternatively sent by the target or monitored device 205 to the monitoring device 202 in the return heartbeat message HBn 210. The utilization of computing resources may be indicative of the total capacity of system computing resources which are currently being consumed. An increase in the utilization may be indicative of a degradation in the overall performance of the system.

Figure 3:
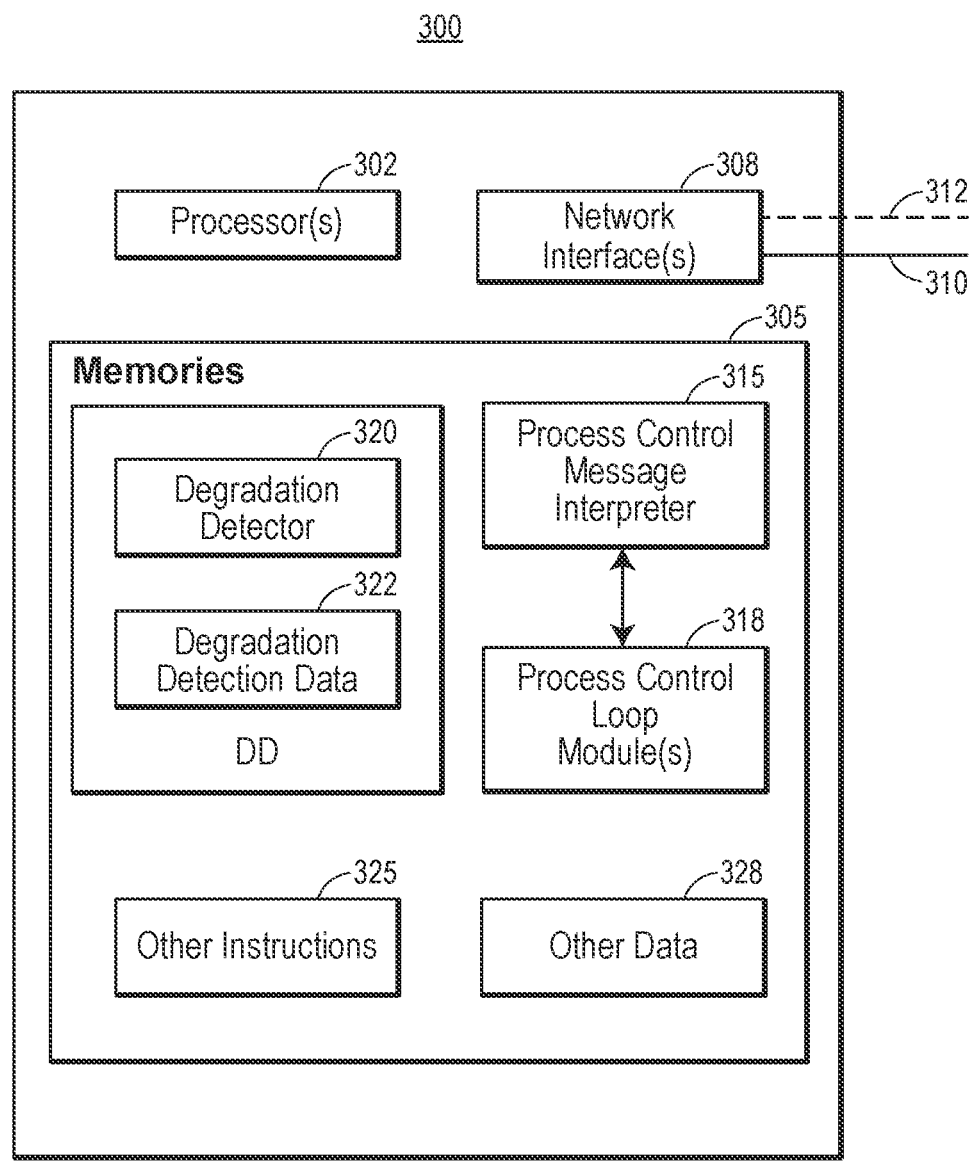
FIG. 3 includes a simplified block diagram of an example control loop component configured to detect degradation of another control loop component.

FIG. 3 illustrates a simplified block diagram of an example component 300 of a process control loop. For example, the component 300 may be one of the control devices 102a-102n, 105a-105m or the I/O gateway or server 110, or the component 300 may be the component 202 or the component 205 of FIGS. 2A and 2B. For ease of illustration, and not for limitation purposes, the component 300 is described with simultaneous reference to FIGS. 1, 2A, and 2B.

As shown in FIG. 3, the component 300 includes or utilizes one or more processors 302, one or more memories 305, and one or more network interfaces 308 communicatively connecting the component 300 to a data highway or communication link of the process control system, such as the data highway 115. In embodiments in which the component 300 is a logical control device 105a-105m, the processors 302, memories 305, and network interfaces 308 utilized by the component 300 may be resources which are shared among multiple logical control devices. For example, the processors 302, memories 305, and network interfaces 308 of a logical control device component 300 may be provided by a host server 118a, 118b on which the logical control device component 300 and other logical control devices execute.

The network interfaces 308 enable the component 300 to communicate with the target component via two separate channels of the data highway. One of the channels 310 is a communications channel 310 via which the component 300 sends and receives process control and signaling messages to and from other loop components during run-time execution of the control loop to thereby control at least a portion of an industrial process. The other channel 312 is a diagnostic channel via which the component 300 sends and receives heartbeat messages (such as heartbeat messages HBn 208, 210, 225) to and from the target component of the control loop (such as the component 205) for the purposes of monitoring the target component for performance degradation and detecting performance degradation of the target component. The communications channel 310 may be a dedicated channel or may be shared among multiple components and devices, for example. In an embodiment, the diagnostic channel 312 may be a dedicated channel which is exclusively utilized by the component 300 and its corresponding target component to exclusively deliver heartbeat messages HBn 208, 210, 225 and optionally other types of diagnostic messages therebetween. For example, the component 300 may prevent communication and control messages utilized for run-time process control from being sent/received via the diagnostic channel 312.

The component 300 also includes or utilizes a process control message interpreter 315 and one or more process control loop modules 318. The process control message interpreter 315 and the process control loop module 318 may include respective sets of computer-executable instructions which are stored on the memories 305 and executable by the one or more processors 302, in embodiments. In some embodiments, at least a portion of the process control message interpreter 315 may be implemented using firmware and/or hardware of the component 300. Generally speaking, the process control message interpreter 315 and the process control loop module 318 operate in conjunction to process incoming and outgoing process control messages (e.g., both control and signaling messages) which are received and transmitted by the component 300 via the communications channel 312. It is noted that while FIG. 3 illustrates the process control message interpreter 315 and process control loop module 318 as being separate modules or entities, in some embodiments of the component 300 the process control message interpreter 315 and the process control loop module 318 may be implemented as an integral module or entity.

In an example configuration in which the component 300 is a control device 102a-102n, 105a-105m, the component 300 receives a control message via the communications channel 312 and the network interface 308, and the process control message interpreter 315 processes the control message to obtain the payload or content of the message for the process control loop module 318. The process control loop module 318 includes one or more control routines or control logic with which the component 300 is particularly configured. The control routines or logic operate on the content of the message as an input (and, in some cases, in conjunction with other inputs) to generate a control signal, which is packaged by the message interpreter 315 and transmitted from the component 300 to a recipient component or device via the network interfaces 308 and the communications channel 310. In embodiments in which the component 300 is a logical control device 105a-105m, the process control message interpreter 315 and the process control loop module 318 utilized by the component 300 may be resources which are shared among multiple logical control devices. For example, the process control message interpreter 315 and the process control loop module 318 of a logical control device component 300 may be provided by a host server 118a, 118b on which the logical control device component 300 executes. The host server 118a, 118b may activate/deactivate more or less instances of the process control message interpreter 315 and/or the process control loop module 318 to service its hosted logical control devices as needed, for example.

In another example configuration in which the component 300 is the I/O gateway 110, the component 300 receives a control message or signal which is to be routed to a process control loop component or device, and the process control message interpreter 315 processes the message or signal to determine a recipient device of the message/signal. The recipient device may be a field device 108a-108p or a control device 102a-102b, 105a-10m, for example. The process control loop module 318 includes switching or routing logic or routines which optionally converts or transforms the process control message/signal into a format which is suitable for transmission to the recipient device, and transmits the message/signal to the recipient device. For example, when the component 300 receives a control message from one of the physical or logical controllers 102a-102n, 105a-105m via the communications channel 310 of the data highway 115, and the control message is intended to be delivered to another one of the physical or logical controllers 102a-102n, 105a-105m, the process control message interpreter 315 and/or the process control loop module 318 may merely forward the control message to its recipient controller 102a-102n, 105a-105m, e.g., via the communications channel 310. In another example in which the component 300 receives a control message from one of the physical or logical controllers 102a-102n, 105a-105m via the communications channel 310, and the control message is intended to be delivered to a field device 108a-108p, the process control loop module 318 may convert the message into a signal which is deliverable via a respective link 112a-112p to the recipient field device 108a-108p and route the signal to the recipient field device 108a-108p via the respective link 112a-112p. In yet another example in which the component 300 receives a signal from one of the field devices 108a-108p via a respective link 112a-112p and the signal contents are to be delivered to a control device 102a-102n, 105a-105m, the process control loop module 318 may convert the signal contents into a control message and transmit the control message to the recipient control device 102a-102n, 105a-105m via the communications channel 310. It is noted that as the I/O gateway 110 is typically implemented on a computing platform, the I/O gateway 110 may support multiple instances of the process control message interpreter 315 and/or of the process control loop module 318. For example, the I/O gateway 110 may activate/deactivate more or less instances of the process control message interpreter 315 and/or the process control loop module 318 as needed.

In some embodiments, the component 300 is a degradation detecting component which monitors a target component of the process control loop for response performance degradation, and detects response performance degradation of the target component. The degradation detecting component 300 and the target component are included in a same process control loop, and as such are both components of the process control loop. For example, the degradation detecting component 300 may be the component 202 of FIGS. 2A and 2B. In such embodiments, the component 300 includes a degradation detector 320 and a degradation store 322 stored on the one or more memories 305. The degradation detector 320 may include computer-executable instructions which are executable by the one or more processors 302 to perform the message flows 200, 220 and corresponding actions as described above for component 202 in FIGS. 2A and 2B. Additionally or alternatively, the degradation detector 320 may be executable by the one or more processors 302 to perform at least a portion of the method 400 for detecting loop component degradation, which is discussed in more detail below. Generally speaking, the degradation detector 320 is configured to send and receive heartbeat messages to and from a target component (e.g., the component 205) via the diagnostic channel 312 to monitor for, detect, and diagnose reasons for decreases in response performance of the target component outside its normal, acceptable operating bounds, e.g., degradation of the target component. In some embodiments, the degradation detector 320 is configured to notify operating personnel of detected degradation of the target component, determine one or more mitigating actions, and/or initiate at least one of the mitigating actions, such as is described elsewhere within this disclosure.

Additionally in embodiments in which the component 300 is a degradation detecting component, the degradation detector 320 may be configured to determine the normal, standard, or acceptable operating bounds of the target component, e.g., by determining an average round trip time (RTT) for a predetermined number of heartbeat messages sent to and received from the target component and corresponding standard deviations, such as in a manner such as described above for FIGS. 2A and 2B. The degradation detector 320 stores the determined average RTT and corresponding standard deviations in the degradation detection data store 322, for example, and utilizes the stored data to monitor for and detect target component degradation. Calculating or determining the average RTT and corresponding standard deviation may be performed by the component 300 automatically (e.g., periodically, upon occurrence of certain events such as reconfiguration, software upgrade, etc. of the target component, and so on) and/or upon manual or user command. For example, operating personnel may instruct the component 300 to determine an average RTT and standard deviation associated with the target component at different points in the life cycle of the target component, upon completion of a software upgrade at the target component, upon completion of a reconfiguration of the target component, upon completion of maintenance of the component, at various system loads and system configurations, etc. The degradation detector 320 may determine and store (e.g., in the degradation data store 322) multiple average RTTs and standard deviations for various loads, configurations, and scenarios, if desired.

Of course, the component 300 may additionally include other instructions 325 and other data 328 to utilize in its process control and/or degradation detection operations, and/or in its other operations.

Further, is noted that in some cases, the component 300 may detect component degradation of multiple target components. For example, the I/O gateway 110 may be configured to monitor for and detect degradation of multiple controllers 102a-102n, 105a-105m.

Still further, it is noted that it is not necessary for all components of a process control loop to be configured to perform degradation detection. For example, in FIG. 1, components 102a, 105g, 105h, and 110 are shown as being configured for degradation detection by the encircled DD, and as such are each configured to include respective instances of the degradation detector 320 and the degradation detection store 322. On the other hand, components 102n, 105a, and 105h are shown as not being configured for degradation detection and as such, each of components 102n, 105a, and 105h may omit or deactivate respective instances of the degradation detector 320 and the degradation detection store 322.

In some embodiments, the component 300 may additionally or alternatively be a target component of the process control loop which is being monitored for performance degradation by another, degradation detecting component of the process control loop. For example, the component 300 may be the component 205 of FIGS. 2A and 2B. In these embodiments, the component 300 may or may not additionally be a degradation detecting component; that is, the component 300 may or may not include or utilize the degradation detector 320 and the degradation detection data 322. In any case, in embodiments in which the component 300 is a target component, the component 300 receives a heartbeat message HBn 208 from the degradation detecting component via the diagnostic channel 312. Upon receipt of heartbeat message HBn 208, the component 300 processes the received heartbeat message HBn 208 via the process control message interpreter 315, and forwards or otherwise returns the heartbeat message HBn 210, 225 back to the sending component via the diagnostic channel 312. In particular, the component 300, via the process control message interpreter 315, returns the heartbeat message HBn 210, 225 at a fastest rate at which the component 300 is configured to report or transmit process control values. For example, if the component 300 is the I/O gateway 110 and the I/O gateway is configured to report or transmit process control values at a maximum rate of 50 ms, the component 300 returns the heartbeat message HBn 210, 225 to the sending component at the rate of 50 ms.

Figure 4:
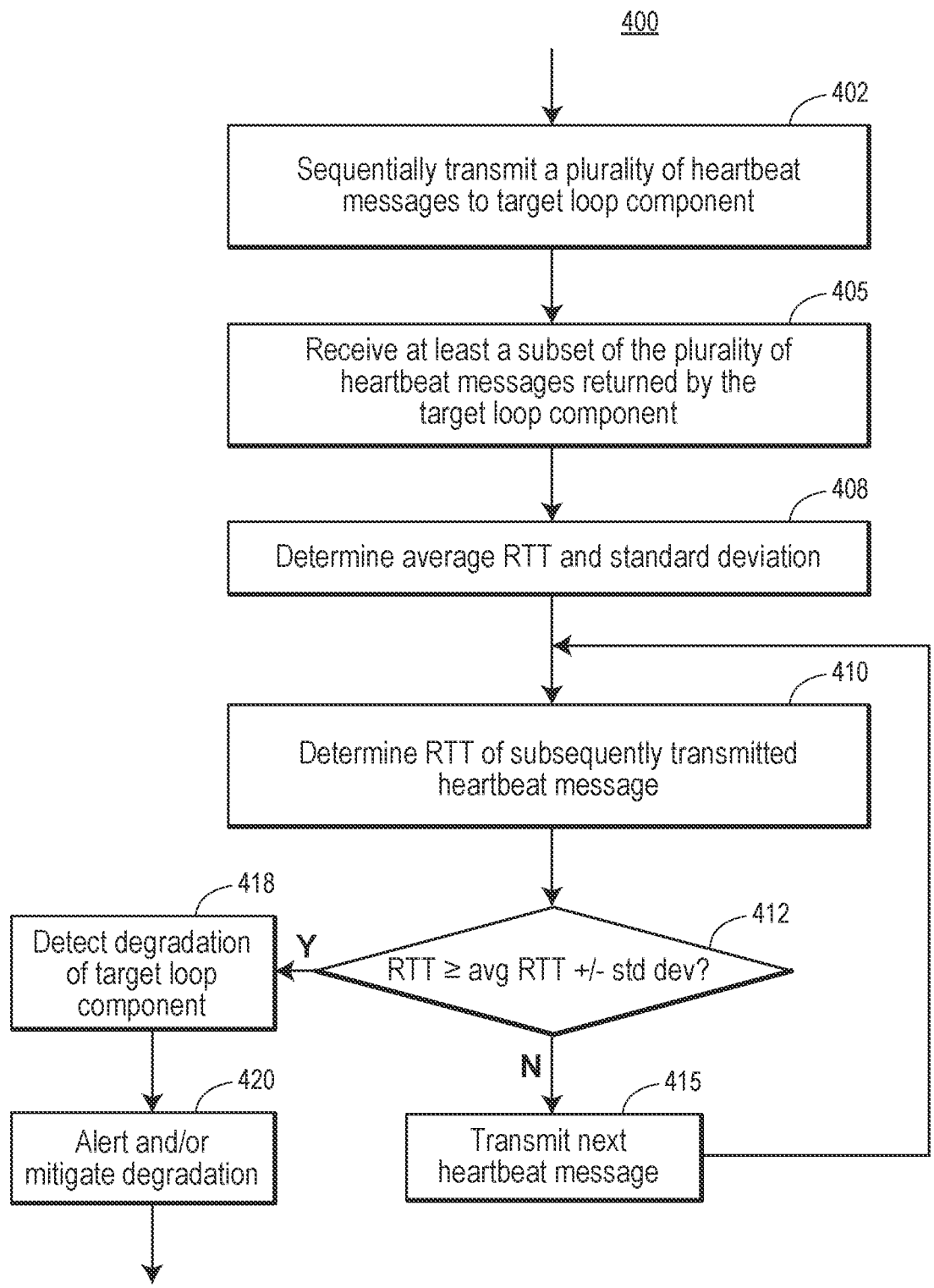
FIG. 4 depicts a flow diagram of an example method of detecting degradation of a control loop component.

FIG. 4 depicts a block diagram of example method 400 of detecting degradation in a component of a process control loop included in a distributed process control system (DCS) of a physical industrial process plant, such as the portion 100 of the process control system illustrated in FIG. 1. In embodiments, different instances of at least a portion of the method 400 may be respectively performed by one or more control devices 102a-102n, 105a-105m and/or by the I/O gateway or server 110. Additionally or alternatively, at least a portion of the method 400 may be performed by the component 202 of FIGS. 2A and 2B, or by the component 300 of FIG. 3. For example, at least a portion of the method 400 may be performed by the degradation detector 320 of the component 300. In embodiments, the method 400 may include additional or alternate blocks other than those discussed within this disclosure.

At a block 402, the method 400 for detecting component degradation in a process control loop includes, at a first component of the process control loop, sequentially transmitting, via a diagnostic channel, a plurality of heartbeat messages to a second component of the process control loop. The first component and the second component of the process control loop are communicatively connected via both the diagnostic channel and a communications channel, such as the diagnostic channel 312 and the communications channel 310 of FIG. 3. For example, the first component may be the component 202 of FIGS. 2A and 2B, and as such may be the I/O gateway 110 or one of the process controllers 102a-102n, 105a-105m. Accordingly, when the first component is the I/O gateway or server 110, the second component may be one of the process controllers 102a-102n, 105a-105m, and when the first component is one of the process controllers 102a-102n, 105a-105m, the second component is the I/O gateway or server 110. For example, the second component may be the component 205 of FIGS. 2A and 2B.

Upon the second component receiving each heartbeat message transmitted by the first component, the second component forwards or otherwise returns the heartbeat message to the first component via the diagnostic channel. Accordingly, at a block 405, the method 400 includes receiving, at the first component from the second component via the diagnostic channel, at least a subset of the plurality of heartbeat messages, where the at least the subset of the plurality of heartbeat messages have been returned to the first component by the second component upon respective receipt at the second component.

At a block 408, the method 400 includes determining, by the first component, an average response time or round trip time (RTT) of the second component based on respective RTTs of the at least the subset of the plurality of heartbeat messages. The respective RTTs may be determined based on respective transmission and reception times (e.g., respective TS1s and TS2s as previously discussed with respect to FIGS. 2A, 2B) of the at least the subset of the plurality of heartbeat messages received by the first component. A minimum number of messages included in the received at least the subset of the plurality of heartbeat messages and used to determine the average response time of the second component may be preconfigured and optionally adjustable. Additionally, at the block 408, the method 400 may include determining, based on the RTTs of the at least the subset of the plurality of heartbeat messages, a standard deviation corresponding to the average RTT of the second component.

In embodiments, the method 400 may include storing, at the first component, the average response time or average RTT of the second component and the standard deviation, for example. Additionally or alternatively, the method 400 may include determining and storing an acceptable range of RTTs for the second component. For example, the lower boundary of the acceptable range of RTTs for the second component may be the average RTT minus the standard deviation, and the upper boundary of the acceptable range of RTTs may be the average RTT plus the standard deviation. In some embodiments, the method 400 may additionally or alternately include storing, at the first component, a threshold corresponding to a periodicity of a module scheduler execution (e.g., a periodicity-based threshold). The periodicity-based threshold may be determined, for example, based on a configuration of the second component, and any measured RTTs exceeding the periodicity-based threshold may be unacceptable RTTs of the second component.

At a block 410, at some time after the average RTT and corresponding standard deviation and/or the periodicity-based threshold have been determined (block 408), the method 400 includes determining an RTT of another heartbeat message subsequently transmitted by the first component, returned by the second component, and received by the first component, e.g., in a manner such as discussed with respect to FIGS. 2A, 2B. At a block 412, the method 400 determines whether or not the RTT of the subsequent heartbeat message falls between the upper boundary and the lower boundary of the range of acceptable RTTs for the second component, e.g., within plus or minus a standard deviation of the average RTT for the second component, and/or whether or not the RTT of the subsequent heartbeat message exceeds the periodicity-based threshold of the second component. When the RTT of the subsequent heartbeat message is determined to be an acceptable RTT by either or both of the acceptability criteria (e.g., as denoted by the NO leg of block 412), the method 400 continues on to transmit a next heartbeat message (block 415) and determine its respective RTT (block 410).

On the other hand, when the method 400 determines that the RTT of the subsequent heartbeat message is an unacceptable RTT for the second component (e.g., is not within a plus or minus standard deviation of the average RTT, and/or exceeds the periodicity-based threshold, as denoted by the YES leg of block 412), the method 400 includes detecting degradation of the second loop component (block 418) based on the outlying RTT, and correspondingly alerting a user of the degradation, determining one or more actions to mitigate the degradation, and/or initiating at least one of the mitigating actions (block 420), such as in a manner described above.

Thus, by utilizing the techniques for detecting loop component degradation described herein, degradations in control devices and in the I/O gateway are able to be determined from changes in their respective performance responsiveness and/or trends in such changes. As such, the process control system is able to notify operating personnel of component degradation prior to the degradation resulting in an occurrence of a failure or catastrophic event. Indeed, the process control system is able to notify operating personnel of component degradation sooner than is able to be detected by known diagnostic processes, as known diagnostic processes are typically scheduled to occur, run, and respond at rates that are slower and/or lower priority than those of real-time process control and communication messages. Further, in some embodiments, the process control system may recommend or suggest, to operating personnel, one or more mitigating actions for addressing the detected degradation and, in some cases, may automatically initiate one or more of the mitigating actions to address the detected degradation. Therefore, the techniques described herein advantageously provide an early degradation detection system with an optional, corresponding automatic degradation mitigation system.

Further advantageously, the techniques described herein may be utilized to standardize load balancing across various control loop components of a computerized process control system. For example, the loading of control logic within control devices, the reporting rate of the I/O gateway, the number of clients serviced I/O gateway, the loading of physical computing platforms supporting logical control devices, and the loading of the physical computing platform(s) supporting the I/O gateway may be adjusted (e.g., automatically adjusted) based on a comparison of measured RTTs with respect to average RTTs. Further advantageously, the determinism/non-determinism measurements of loop component RTTs may be utilized as a performance or health metric for various loop components, process control loops, and even of the process control system itself, and as such, may advantageously provide mechanisms for monitoring and assessing the overall performance, health, and utilization of for the various loop components, process control loops, and even of the process control system itself as a whole.

When implemented in software, any of the applications, modules, etc. described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The particular features, structures, and/or characteristics of any specific embodiment may be combined in any suitable manner and/or in any suitable combination with one and/or more other embodiments, including the use of selected features with or without corresponding use of other features. In addition, many modifications may be made to adapt a particular application, situation and/or material to the essential scope or spirit of the present invention. It is to be understood that other variations and/or modifications of the embodiments of the present invention described and/or illustrated herein are possible in light of the teachings herein and should be considered part of the spirit or scope of the present invention. Certain aspects of the invention are described herein as exemplary aspects.

What is claimed:

1. A system for detecting component degradation in an industrial process plant, the system comprising:

a first component and a second component included in a control loop via which an industrial process is controlled by a process control system of the industrial process plant, the process control system including an I/O gateway that is communicatively connected to a plurality of process controllers via respective communications channels, and the plurality of process controllers communicatively disposed between the I/O gateway and respective one or more field devices, and the first component communicatively connected to the second component of the process control system via a diagnostic channel and via a communication channel, the first component being one of the I/O gateway or a process controller included in the plurality of process controllers, the second component being the other one of the I/O gateway or the process controller, the second component including a routine executing at the second component and configured to:

process communications and control messages that are received, via the communications channel, at the second component for controlling the industrial process, and return, via the diagnostic channel to the first component, any heartbeat messages that are received at the second component via the diagnostic channel upon respective receipt at the second component, and the first component configured to:

transmit, via the communications channel to the second component, the communications and control messages for controlling the industrial process;

sequentially transmit, via the diagnostic channel, a plurality of heartbeat messages to the second component;

receive, via the diagnostic channel, at least a subset of the plurality of heartbeat messages returned to the first component by the second component;

determine an average response time of the second component based on at least one of: a periodicity of a module scheduler execution at the second component, or respective round trip times (RTTs) of the at least the subset of the plurality of heartbeat messages, the respective RTTs determined based on respective times of transmission and reception of the at least the subset of the plurality of heartbeat messages at the first component; and detect a degradation of the second component when an RTT of a subsequent heartbeat message transmitted by the first component to the second component via the diagnostic channel exceeds a threshold corresponding to the average response time of the second component.

2. The system of claim 1, wherein the first component does not transmit the communication and control messages to the second component via the diagnostic channel.

3. The system of claim 1, wherein the diagnostic channel is a dedicated diagnostic channel established for exclusive use by the first component and the second component.

4. The system of claim 1, wherein the degradation of the second component is detected when the RTT of the subsequent heartbeat message is outside of a given number of standard deviations from the average response time.

5. The system of claim 4, wherein the given number of standard deviations is one standard deviation.

6. The system of claim 1, wherein the second component is configured to return received heartbeat messages via the diagnostic channel at a fastest update rate supported by the second component.

7. The system of claim 1, wherein the first component is further configured to, upon the detection of the degradation, perform at least one of:
cause an alert or alarm indicative of the detected degradation to be generated;
cause a load corresponding to the second component to be automatically re-balanced;
determine a mitigating action;
cause the mitigating action to be automatically performed within the process control system; or
cause an alert or alarm indicative of the mitigating action to be presented at a user interface.

8. The system of claim 1, wherein the process control system is further configured to determine one or more metrics indicative of a health of the process control system as a whole based on respective average response times of at least one of the plurality of process controllers or the I/O gateway.

9. The system of claim 8, wherein the process control system is further configured to detect a degradation in the health of the process control system as a whole based on a change in the one or more metrics.

10. The system of claim 9, wherein the one or more metrics are indicative of a level of latency of the process control system as a whole, and the detected degradation in the health of the process control system as a whole includes a reduction in an availability of computing resources.

11. The system of claim 9, wherein the one or more metrics are indicative of a level of jitter of the process control system as a whole, and the detected degradation in the health of the process control system as a whole includes an increase in a contention for computing resources.

12. The system of claim 1, wherein a total number of heartbeat messages included in the at least the subset of the plurality of heartbeat messages is greater than or equal to a minimum number of heartbeat messages required to determine the average response time of the second component, and the minimum number of heartbeat messages is configurable.

13. The system of claim 1, wherein the first component is the process controller and the second component is the I/O gateway.

14. The system of claim 13, wherein:
the process control system is further configured to determine a metric indicative of a health of the I/O gateway based on at least one of respective average response times, respective average latencies, or respective average jitters corresponding to the I/O gateway; and
the at least one of respective average response times, respective average latencies, or respective average jitters corresponding to the I/O gateway is determined based on at least one of respective response times, respective latencies, or respective jitters corresponding to the I/O gateway and determined by the plurality of process controllers.

15. The system of claim 13, wherein the process controller is a physical process controller, and the physical process controller is configured to determine the respective RTTs of the at least the subset of the plurality of heartbeat messages and the RTT of the subsequent heartbeat message by using a hardware clock included in the physical process controller.

16. The system of claim 13, wherein:
the process controller is a virtual process controller;
each heartbeat message included in the at least the subset of the plurality of heartbeat messages returned by the I/O gateway includes an indication of a respective time at which the each heartbeat message was received at the I/O gateway and a respective time at which the I/O gateway transmitted the respective return of the each heartbeat message to the virtual process controller; and
the virtual process controller is configured to determine the respective RTTs of the at least the subset of the plurality of heartbeat messages further based on the respective times indicated in the each heartbeat message.

17. The system of claim 16, wherein the virtual process controller is implemented via a container.

18. The system of claim 13, wherein:
the average response time of the second component is indicative of a communications delay introduced by the I/O gateway;
a control signal generated by the controller to drive a field device includes a target value for the field device and a time-to-apply field indicating the communications delay introduced by the I/O gateway.

19. The system of claim 18, wherein the field device stores an indication of the target value for the field delayed by the communications delay introduced by the I/O gateway.

20. The system of claim 1, wherein the first component is the I/O gateway and the second component is the process controller.

21. The system of claim 20, wherein the I/O gateway is configured to determine the respective RTTs of the at least the subset of the plurality of heartbeat messages and the RTT of the subsequent heartbeat message by using a hardware clock included in the I/O gateway.

22. The system of claim 1, wherein the process controller is a safety system controller.

23. A method for detecting component degradation in a process control system, the method comprising:
at a first component of the process control system, the process control system including an I/O gateway that is communicatively connected to a plurality of process controllers via respective communications channels, and the plurality of process controllers communicatively disposed between the I/O gateway and respective one or more field devices,
the first component communicatively connected to a second component via a communications channel and a diagnostic channel, the first component and the second component included in a control loop via which an industrial process is controlled by the process control system,
the first component being one of the I/O gateway or a process controller included in the plurality of process controllers, and
the second component being the other one of the I/O gateway or the process controller, and the second component including a routine executing at the second component and configured to:
process communications and control messages that are received, via the communications channel, at the second component for controlling the industrial process, and return, via the diagnostic channel to the first component, any heartbeat messages that are received at the second component via the diagnostic channel upon respective receipt at the second component:

transmitting, by the first component to the second component via the communications channel, communications and control messages for controlling the industrial process;

sequentially transmitting, by the first component to the second component via the diagnostic channel, a plurality of heartbeat messages;

receiving, at the first component from the second component via the diagnostic channel, at least a subset of the plurality of heartbeat messages;

determining, by the first component, an average response time of the second component based on at least one of: a periodicity of a module scheduler execution at the second component, or respective round trip times (RTTs) of the at least the subset of the plurality of heartbeat messages, the respective RTTs determined based on respective transmission and reception times of the at least the subset of the plurality of heartbeat messages at the first component; and detecting a degradation of the second component when an RTT of a subsequent heartbeat message transmitted by the first component to the second exceeds a threshold corresponding to the average response time of the second component.

24. The method of claim 23, further comprising, upon detecting the degradation of the second component, at least one of:

generating an alert or an alarm indicative of the detected degradation;

automatically re-balancing a load at the second component;

determining a mitigating action for the detected degradation;

causing the mitigating action to be automatically performed; or generating an alert or an alarm indicative of the mitigating action.

25. The method of claim 24, wherein the second component is the process controller, and determining the mitigating action includes determining a modification to a control routine executed by the process controller.

26. The method of claim 24, wherein the second component is the process controller, the process controller is a virtual process controller executing on a physical computing platform, and causing the mitigating action to be automatically performed includes causing the virtual process controller to be migrated to another physical computing platform for execution.

27. The method of claim 26, wherein the virtual process controller is implemented via a container, and causing the virtual process controller to be migrated to the another physical computing platform comprises assigning the container to the another physical computing platform.

28. The method of claim 24, wherein the second component is the I/O gateway, and determining the mitigating action includes at least one of: determining a modification to a reporting rate of the I/O gateway, or determining a modification to a number of clients serviced by the I/O gateway.

29. The method of claim 24, wherein determining the mitigating action includes determining a modification to a load of the physical computing platform supporting the second component.

30. The method of claim 29, wherein determining the modification to the load of the physical computing platform comprises determining respective modifications to one or more of: a load of a CPU (Central Processing Unit) of the physical computing platform, a memory usage of the physical computing platform, or a disk space usage of the physical computing platform.

31. The method of claim 23, wherein detecting the degradation of the second component includes detecting the degradation of the second component when the RTT of the subsequent heartbeat message is outside of a pre-determined one or more standard deviations from the average response time of the second component.

32. The method of claim 23, further comprising determining one or more metrics indicative of a health of the process control system as a whole based on respective average response times of at least one of the plurality of process controllers or the I/O gateway.

33. The method of claim 32, further comprising detecting a degradation in the health of the process control system as a whole based on a change in the one or more metrics.

34. The method of claim 33, wherein:
the one or more metrics are indicative of a level of latency of the process control system as a whole; and
detecting the degradation in the health of the process control system as a whole includes detecting a reduction in an availability of computing resources based on the change in the level of latency.

35. The method of claim 33, wherein:
the one or more metrics are indicative of a level of jitter of the process control system as a whole; and
detecting the degradation in the health of the process control system as a whole includes detecting an increase in a contention for computing resources based on the change in the level of jitter.

36. The method of claim 23, further comprising determining, by the first component, the respective round trip time (RTT) of each heartbeat message of the at least the subset of the plurality of heartbeat messages and the RTT of the subsequent heartbeat message.

37. The method of claim 36, wherein:
the first component is the process controller, the process controller is a virtual process controller, and the second component is the I/O gateway;
the method further comprises, for each heartbeat message included in the at least the subset of the plurality of heartbeat messages, receiving an indication of a respective time of receipt of the each heartbeat message at the I/O gateway and a respective time of transmission of the return of the each heartbeat message by the I/O gateway, and
determining the average response time of the second component is further based on the received indications of the respective times of receipt at the I/O gateway and the respective times of transmissions of the returns by the I/O gateway.

38. The method of claim 36, wherein determining the respective RTT of the each heartbeat message of the at least the subset of the plurality of heartbeat messages and of the RTT of the subsequent heartbeat message is based on a hardware clock included in the first component.

39. The method of claim 23,
further comprising configuring a minimum number of heartbeat messages based on which the average response time of the second component is to be calculated; and
wherein determining the average response time of the second component comprises determining the average response time of the second component upon receiving, at the first component, at least the minimum number of heartbeat messages returned from the second component.

40. The method of claim 23, wherein:
the first component is the process controller and the second component is the I/O gateway;
the method further comprises determining a metric indicative of a health of the I/O gateway based on at least one of respective average response times, respective average latencies, or respective average jitters corresponding to the I/O gateway; and
the at least one of respective response times, respective latencies, or respective jitters corresponding to the I/O gateway are determined by the plurality of process controllers based on respective heartbeat messages.

41. The method of claim 23, wherein the first component is the process controller and the second component is the I/O gateway, and the method further comprises:
determining a value of a time-to-delay parameter based on the average response time of the I/O gateway;
generating, by the process controller as an output of an execution of a control module, a message to drive a field device, the message including an indication of a target value for the field device and the time-to-delay parameter populated with the value determined based on the average response time of the I/O gateway; and
transmitting, by the process controller, the generated message to the field device via the I/O gateway.

42. The method of claim 23, further comprising establishing the diagnostic channel between the first component and the second component for dedicated use, including preventing communication and control messages utilized in controlling the industrial process from being delivered between the first component and the second component via the diagnostic channel.

43. The method of claim 23, wherein the method further comprises processing, by the first component, communication and control messages that are sent by and/or received at the first component via the communication channel to thereby execute the control loop to control at least a portion of the industrial process.

44. The method of claim 43, wherein:
the routine executes at the second component at a fastest update rate supported by the second component.

* * * * *